United States Patent
Takemoto et al.

(10) Patent No.: US 7,097,763 B2
(45) Date of Patent: Aug. 29, 2006

(54) ION EXCHANGE FILTER APPARATUS

(75) Inventors: Shinichiro Takemoto, Yokohama (JP); Koji Suzuki, Shizuoka (JP)

(73) Assignees: Nissan Motor Co., Ltd., Kanagawa (JP); Toyo Roki Seizo Kabushiki Kaisha, Shizuoka (JP)

(*) Notice: Subject to any disclaimer, the term of this patent is extended or adjusted under 35 U.S.C. 154(b) by 0 days.

(21) Appl. No.: 10/992,707

(22) Filed: Nov. 22, 2004

(65) Prior Publication Data

US 2005/0115883 A1   Jun. 2, 2005

(30) Foreign Application Priority Data

Nov. 28, 2003  (JP)  ............... 2003-399427

(51) Int. Cl.
*B01D 27/02* (2006.01)
(52) U.S. Cl. ............ 210/130; 210/184; 210/251; 210/266; 210/282; 210/352; 210/420
(58) Field of Classification Search ............ 210/99, 210/130, 184, 186, 251, 266, 282, 420, 352; 429/17, 19
See application file for complete search history.

(56) References Cited

U.S. PATENT DOCUMENTS

| | | | |
|---|---|---|---|
| 4,120,787 A | * 10/1978 | Yargeau | ............ 210/664 |
| 4,344,849 A | * 8/1982 | Grasso et al. | ............ 210/662 |
| 5,980,716 A | * 11/1999 | Horinouchi et al. | ............ 204/524 |
| 6,723,460 B1 | * 4/2004 | Derflinger et al. | ............ 429/13 |
| 2005/0058868 A1 | * 3/2005 | Taga | ............ 429/26 |
| 2005/0106433 A1 | * 5/2005 | Takemoto | ............ 429/24 |

FOREIGN PATENT DOCUMENTS

JP   2001-35519   2/2001

* cited by examiner

*Primary Examiner*—Ivars C. Cintins
(74) *Attorney, Agent, or Firm*—McDermott Will & Emery LLP

(57) ABSTRACT

An ion exchange filter apparatus to reduce ions contained in a liquid medium used in a fuel cell system is equipped with an ion exchange filter 6 to receive an ion exchange resin 38. The ion exchange filter 6 includes a flow passage 27 to introduce the liquid medium to the ion exchange resin 38, a bypass passage 7 to flow the liquid medium by bypassing the ion exchange resin 38, and an orifice 21 disposed at a branch section where the bypass passage 7 is branched from the flow passage 27, to determine a flow volume ratio of the liquid medium flowing in the ion exchange resin 38 and the bypass passage 7, wherein a hole diameter of the orifice is set so that a pressure loss generated when all the amount of the liquid medium flows in the bypass passage 7 becomes substantially equal to an allowance maximum pressure loss of the ion exchange filter 6.

7 Claims, 5 Drawing Sheets

ION EXCHANGE FILTER APPARATUS

FIELD OF THE INVENTION

The present invention relates to an ion exchange filter apparatus which is used in a humidification system or a cooling system for a fuel cell system.

BACKGROUND OF THE INVENTION

In case a fuel cell system is applied to a movable body such as a vehicle, a liquid medium such as purified water used for cooling or humidification for a fuel cell is used to be circulated. When the liquid medium is, however, used and circulated over the long term, due to ion separation from a casing of the fuel cell or eluting materials from various hoses or pipes, density of impurities in the liquid medium is gradually increased, which tends to introduce clog or corrosion of the pipes. As an apparatus to remove these impurities, there is in general used an ion exchange filter filled with an ion exchange resin.

Japanese Patent Publication No. 2001-35519A has disclosed that an ion exchange filter is used for removing impurities in a medium and further, a circuit to bypass the ion exchange filter is disposed to perform ion-exchange treatment only to a part of the medium for downsizing of the ion exchange filter.

SUMMARY OF THE INVENTION

According to the above conventional apparatus, however, since the circuit to bypass the ion exchange filter is constructed with a outside pipe being branched from the ion exchange filter, in case a flow volume ratio of a medium flowing in the ion exchange filter and the bypass circuit, namely a split flow ratio thereof is set, it is necessary to perform examinations and experiments with regard to all aspects of the apparatus including pressure loss characteristics of the ion exchange filter and properties of a split flow valve, pipes, and the like. And also when the ion exchange filter is replaced, the split flow ratio needs to be set again. And these examinations and the experiments require long hours, which also deteriorates a replacement work efficiency of the ion exchange filter.

Accordingly it is an object of the present invention to provide an ion exchange filter apparatus, which can easily set a split flow ratio of a medium flowing in an ion exchange filter and a bypass circuit, and can efficiently perform replacement work of an ion exchange filter.

According to one aspect of the present invention, an ion exchange filter apparatus for filtering a liquid medium used in a fuel cell system comprises an ion exchange filter to receive an ion exchange resin for reducing ions contained in the liquid medium. The ion exchange filter comprises: a flow passage to introduce the liquid medium to the ion exchange resin, a bypass passage to flow the liquid medium by bypassing the ion exchange resin, and an orifice disposed at a branch section where the bypass passage is branched from the flow passage, to determine a flow volume ratio of the liquid medium flowing in the ion exchange resin and the bypass passage, wherein a hole diameter of the orifice is set so that a pressure loss generated when all the amount of the liquid medium flows in the bypass passage becomes substantially equal to an allowance maximum pressure loss of the ion exchange filter.

These and other objects, features, aspects and advantages of the present invention will be become apparent to those skilled in the art from the following detailed description, which, taken in conjunction with the annexed drawings, discloses preferred embodiments of the present invention.

BRIEF EXPLANATION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following description of the embodiments of the present invention is provided for illustration only, and not for the purpose of limiting the invention as defined by the appended claims and their equivalents.

In a first preferred embodiment, an ion exchange filter is applied to a humidification system of a fuel cell mounted on a vehicle as a driving source for a vehicle.

Figure 1:
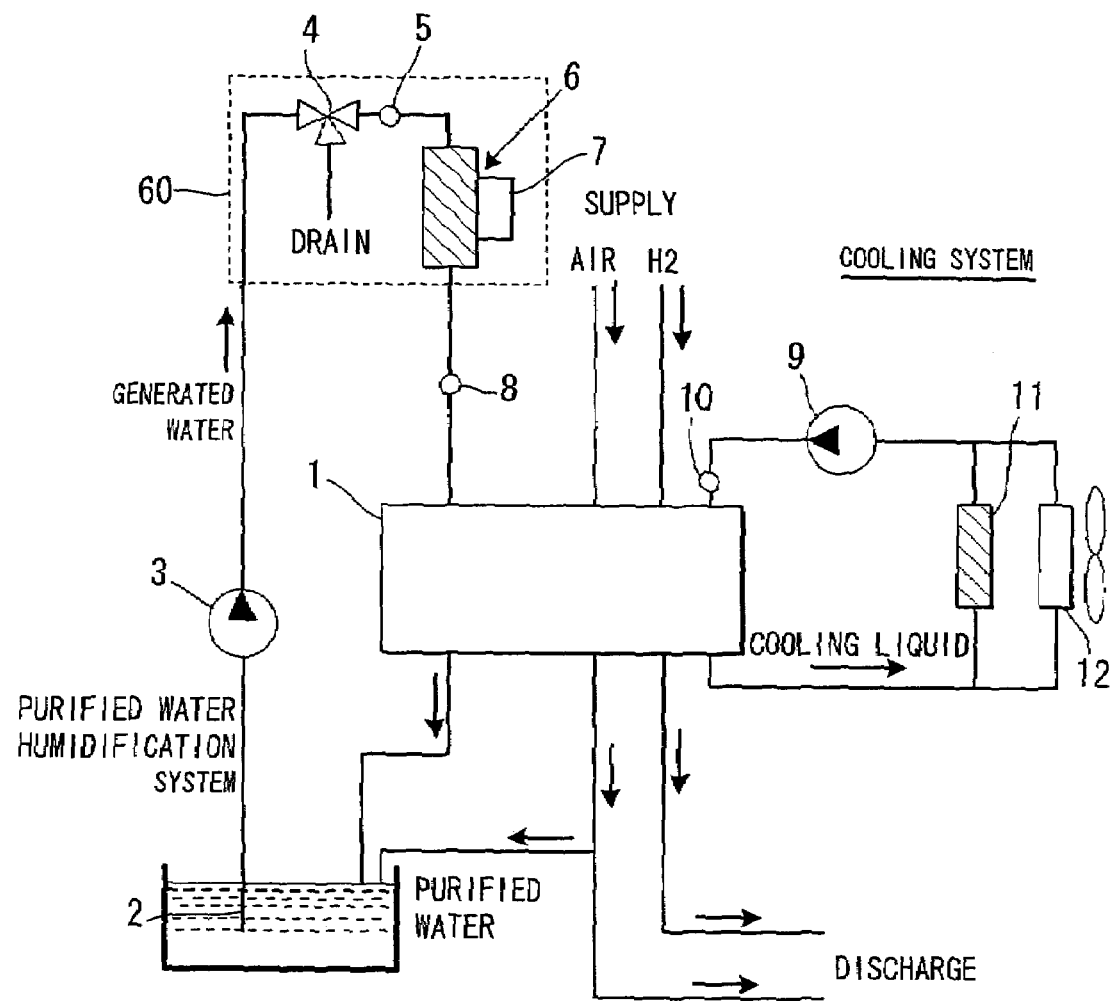
FIG. 1 is a schematic construction view showing a fuel cell system in a first preferred embodiment according to the present invention.

FIG. 1 is a schematic construction view of a humidification system. The humidification system is provided with a fuel cell stack 1, a purified water tank 2 to store purified water for fuel cell humidification, a pump 3 that sucks up the purified water from the purified water tank 2 to supply the purified water to the fuel cell stack 1, a valve 4 to selectively switch a flow passage of the purified water for a drain side, a pressure sensor 5 to detect a line pressure in a purified water circulation line, an ion exchange filter 6 to remove ions contained in the purified water, a bypass passage 7 to bypass the ion exchange filter 6, and a conductivity meter 8 to detect a conductivity rate of the purified water, which are in series arranged in a path where the purified water flows.

In the humidification system for the fuel cell composed of each of the above components using the purified water, the purified water sucked up from the purified tank 2 by the pump 3 passes through the ion exchange filter 6 in a normal operating condition, and in the ion exchange filter 6 the density of ions contained in the purified water, for example, the conductivity rate of the purified water is reduced to a low conductivity equal to or less than 10 µS/cm, and then is supplied to the fuel cell stack 1 where humidification with regard to an oxidant gas, an electrode or the like is performed by using the purified water.

It is noted that the conductivity rate of the purified water is measured by the conductivity meter 8. the purified water left after the humidification period of time is returned back to the purified water tank 2. And the purified water generated by a power generation reaction of the fuel cell stack 1 is also collected to the purified water tank 2.

However, in case a vehicle is parked in the atmosphere below the freezing point, the valve 4 is switched to a drain side to collect the purified water in the path by the pump 3 at a vehicle stop so that damage of pipes of the path, the pump 3, the ion exchange filter 6, the fuel cell stack 1 or the like due to freezing of the purified water in the purified water humidification system is prevented. At a vehicle restart the valve 4 is left to be still opened to the drain side and then when the purified water is supplied to the valve 4 by the pump 3, the valve 4 is switched to a side of the ion exchange filter 6 to flow the purified water into the fuel cell stack 1. On this occasion, a switching timing of the valve 4 is determined in response to a detection value of the pressure sensor 5.

The fuel cell stack 1 produces heat by the power generation, and is provided with a cooling system to circulate a cooling medium between a radiator 12 and the fuel cell stack 1 by a pump 9 in order to cool the fuel cell stack 1.

In the cooling system, since the cooling medium passes through the fuel cell stack 1, the cooling medium having a low conductivity rate is used, and an ion exchange filter 11 is disposed to remove ions contained in the cooling medium. A glycolic antifreeze fluid can be used as a cooling medium for the cooling system. However, in case the purified water is used without use of the antifreeze fluid, the same ion exchange filter as in the above humidification system can be used.

Next, the ion exchange filter 6 in the first preferred embodiment will be explained.

In the first preferred embodiment, the ion exchange filter 6, the pressure sensor 5, the valve 4, an inlet pipe 23, and an outlet pipe 25 are integrally constructed. These integrally constructed components are collectively referred to as an ion exchange filter unit 60.

Figure 2:
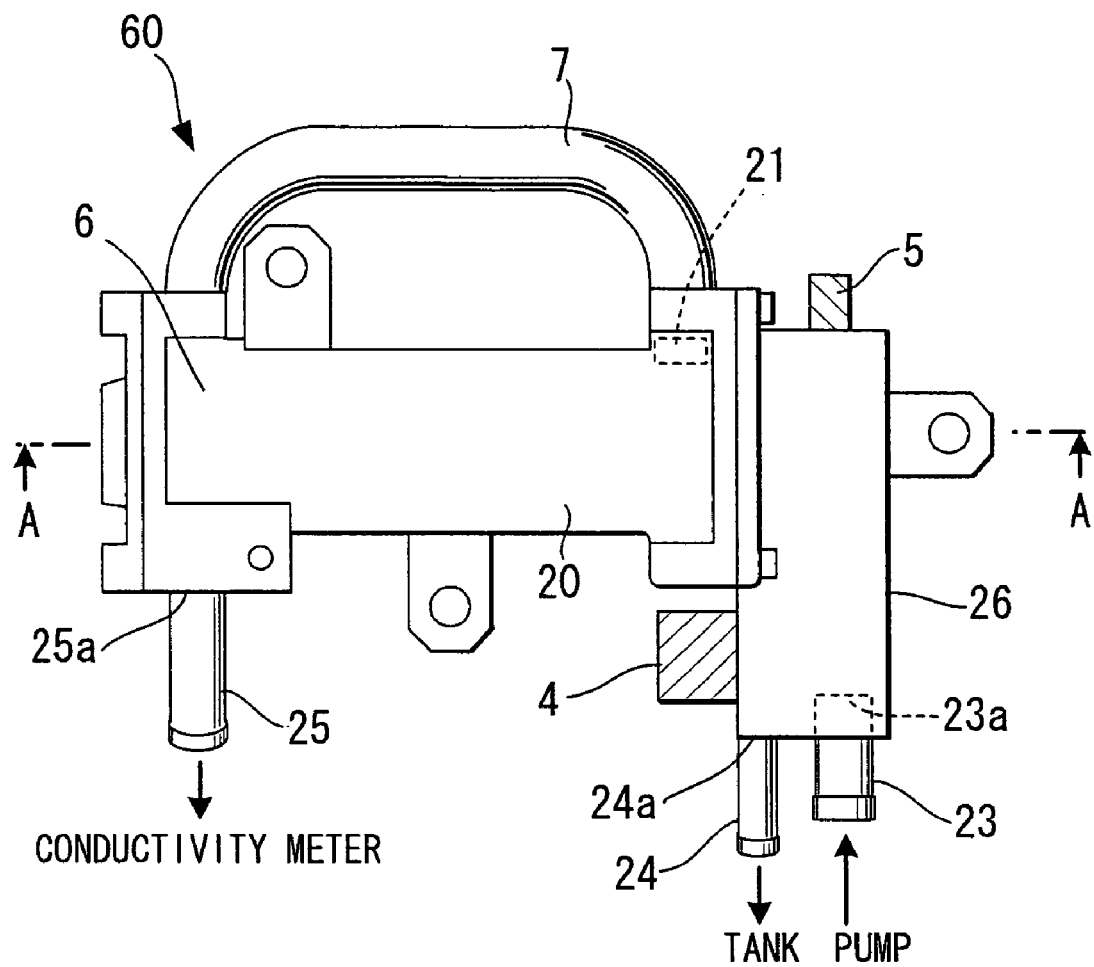
FIG. 2 is a view showing an ion exchange filter in the first preferred embodiment according to the present invention.

FIG. 2 shows an appearance of the ion exchange filter unit 60.

A first foreign material-removal filter 26 to filter the purified water is disposed upstream of the ion exchange filter 6, which is provided with the pressure sensor 5 to detect water pressure in the pipe, the inlet pipe 23 where the purified water supplied from the pump 3 flows, the drain pipe 24 connected to the purified water tank 2, and the valve 4 to switch a flow passage of the purified water entered from the inlet pipe 23 due to being driven by a solenoid or the like for either one of the ion exchange filter 6 or the drain pipe 24.

Herein opening/closing of the valve 4, as described before, are controlled in response to the detection value of the pressure sensor 5, for example, when the pressure sensor 5 detects pressure more than filter design maximum pressure, the valve 4 is opened to discharge the purified water from the drain pipe 24, which prevents damage of the system. And there is a case the valve 4 is opened at an operating end for preventing the freezing of the system.

A filter cartridge 20 filled with the ion exchange filter 6, and transmission of the purified water through the filter cartridge 20 allows removal of ions in the purified water. The bypass passage 7 is disposed in the ion exchange filter 6 to connect the vicinity of an inlet of the filter cartridge 20 to the vicinity of the outlet thereof by bypassing the filter cartridge 20. An orifice 21 is interposed in the vicinity of a branch point where the bypass passage 7 is branched from the vicinity of the inlet of the filter cartridge 20. The orifice 21, as described in detail later, determines a flow volume ratio of the purified water flowing in the filter cartridge 20 and the bypass passage 7, namely, a split flow ratio.

The purified water passing through the filter cartridge 20 or the bypass passage 7 is converged and flows from outlet pipe 25 to an outside of the unit 60 and goes toward the conductivity meter 8.

It is noted that a connection portion 23$a$ between the inlet pipe 23 and the ion exchange filter unit 60, and a connection face 24$a$ between the drain pipe 24 and the ion exchange filter unit 60 are placed at positions lower than a joint face 25$a$ between the outlet pipe 25 and the ion exchange filter unit 60.

Thereby when the purified water inside the ion exchange filter unit 60 is discharged from the drain pipe 24 at an operating end thereof for prevention of the freezing, the purified water is less likely to remain inside the ion exchange filter unit 60. An air is less likely to remain inside the ion exchange filter unit 60 when the purified water is introduced from the inlet pipe 23 at an operating start of the ion exchange filter unit 60.

The valve 4, the drain pipe 24, and the pressure sensor 5 are placed close to a foreign material-pool portion 37. As a result, introduction and discharge of the purified water to and from the ion exchange filter 6 can be efficiently performed, and foreign materials remaining in the foreign material-pool portion 37 can be discharged at a discharge time of the purified water. Further, in the event that an excessive pressure is detected by the pressure sensor 5, the valve 4 is quickly opened to be switched for the drain pipe 24, thereby to prevent the damage of the system.

Figure 3:
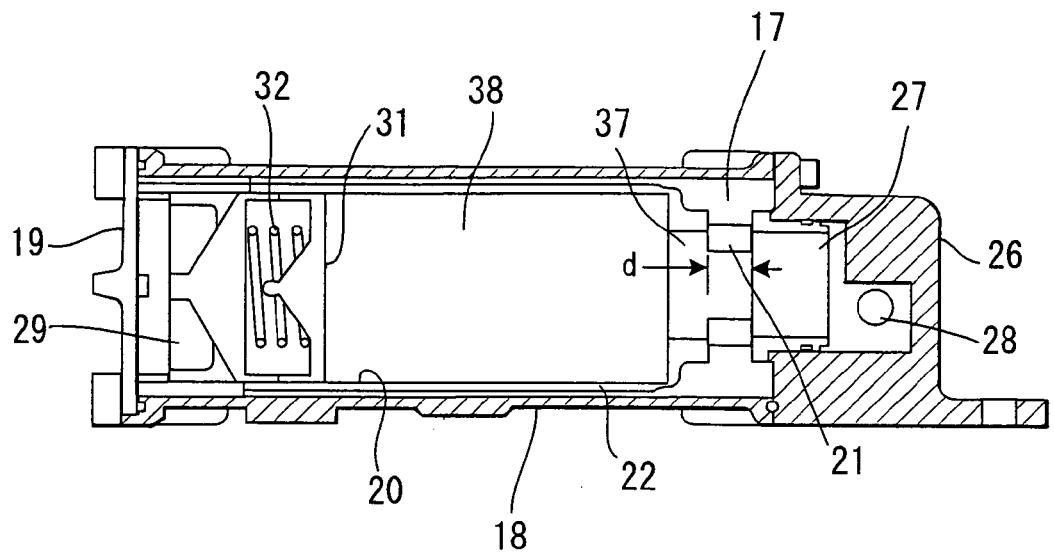
FIG. 3 is a cross sectional view showing the ion exchange filter in FIG. 2.

FIG. 3 is a cross sectional view showing the ion exchange filter 6 taken on lines A—A in FIG. 2.

The filter cartridge 20 is received inside a filter housing 18 and an end of the filter housing 18 is closed by a lid 19.

An ion exchange resin 38, a piston 31 to compress the ion exchange resin 38, and a spring 32 are installed inside a casing 22 of the filter cartridge 20.

And the orifice 21 is disposed in the casing 22 to determine a flow volume ratio of the purified water flowing in the ion exchange resin 38 and the bypass passage 7. This flow volume is determined by a hole diameter "d" of an opening of the orifice 21. A method of setting a hole diameter "d" of the opening will be described later.

A circular flow passage 17 is formed and positioned outside of the orifice 21 between the filter housing 18 and the casing 22, and the flow passage 17 is connected to the bypass passage 7.

The purified water flows from a flow passage 28 communicated with the inlet pipe 23 into a flow passage 27 where the orifice 21 in the casing 22 is installed, and then flows separately in the direction of the ion exchange resin 38 and in the direction of the bypass passage 7 via the orifice 21.

The purified water that has passed through the ion exchange resin 38 and the purified water that has passed through the bypass passage 7 both converge into an outlet 29 of the filter cartridge 20 and then, flow into an outlet pipe 25.

Figures 4A, 4B:
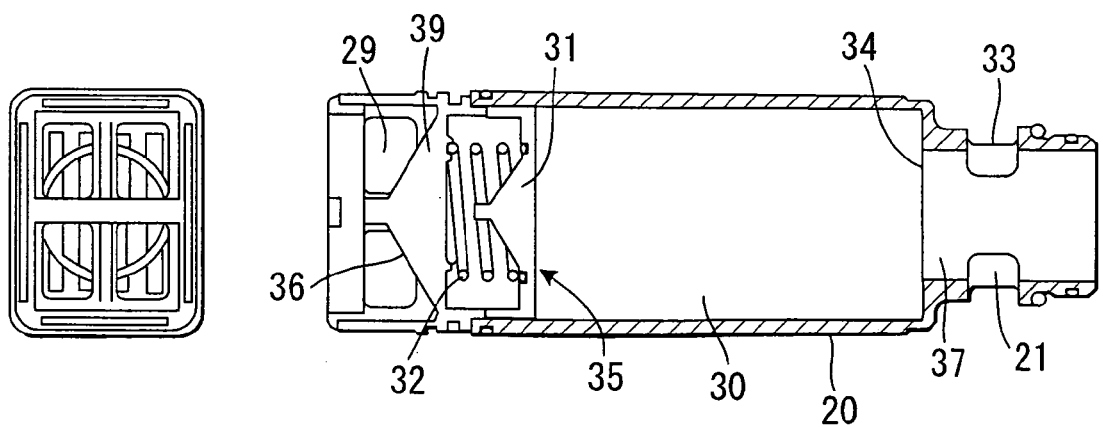
FIG. 4A is a cross sectional view showing a filter cartridge.
FIG. 4B is a side elevation cross sectional view showing the same.

Herein a structure of the filter cartridge 20 will be explained in more detail with reference to FIG. 4.

A filling section 30 is disposed inside the casing 22 to receive the ion exchange resin 38 and a piston 31 urges the ion exchange resin 38 toward an inlet direction of the casing 22 by a spring 32 and a support section 39 supports the spring 32.

It is noted that a slit is formed in each of the piston 31 and the support section 32 so that the purified water can pass through each of them. Three meshes, that is, an inlet section mesh 34, a piston section mesh 35, and an outlet mesh are arranged respectively in an ion exchange resin inlet of the filter cartridge 20, the piston 31, and an ion exchange resin outlet.

A mesh size of the inlet section mesh 34 and the piston section mesh 35 is so coarse as to prevent the ion exchange resin 38 from flowing out, and on the other hand, a mesh size of the outlet section mesh 36 to be determined by a magnitude of foreign materials permitted in the humidification system is so small.

In the humidification system, a mesh for removal of foreign materials may be disposed in anywhere in the flow passages where the purified water flows, but when more meshes than needed are disposed, pressure losses are increased, which is not desired. In the first preferred embodiment, since the outlet section mesh 36 having each opening of a fine size is disposed in the resin outlet 29 of the filter cartridge 20, even if the ion exchange resin 38 broken up to pieces as a result of damages of the freezing or the like passes through the open piston section mesh 35, the ion exchange resin 38 is caught in the fine outlet section mesh 36, to prevent the ion exchange resin 38 from flowing out from the resin outlet 29.

When the ion exchange resin 38 reaches the life time, the filter cartridge 20 is replaced. Then the foreign materials caught in the ion exchange resin outlet 29 can be replaced simultaneously. And since the piston 31 and the spring 32 are integral with the inside cartridge 22, the spring 32 does not jump out in replacing the filter cartridge 20, to provide an easy replacement work. And a fine mesh 33 (a bypass section mesh) is installed in the orifice 21 at a side of the bypass passage 7.

This prevents the foreign materials from flowing into the bypass passage 7.

Just in case the foreign materials flow into the bypass passage 7, the foreign materials can not be caught in the outlet section mesh 36 at the ion exchange resin outlet 29, and flow out to the fuel cell stack 1. According to the first preferred embodiment, however, due to disposing the bypass section mesh 33, the foreign material-pool section 37 is formed in the vicinity of the inlet of the ion exchange resin filling section 30. Therefore, removal of the foreign materials can be performed simultaneously during the replacement work of the filter cartridge 20.

And the bypass section mesh 33 is placed perpendicular to the inlet section mesh 34. Thereby, even in case large foreign materials are clogged or many foreign materials are deposited in the foreign material-pool section 37, the filter cartridge 20 (the ion exchange resin 38) and the bypass passage 7 both are not clogged simultaneously, to avoid the situation where the system stops.

Next, a method of setting a hole diameter "d" of the orifice 21 will be explained with reference to FIG. 5–7.

Figure 7:
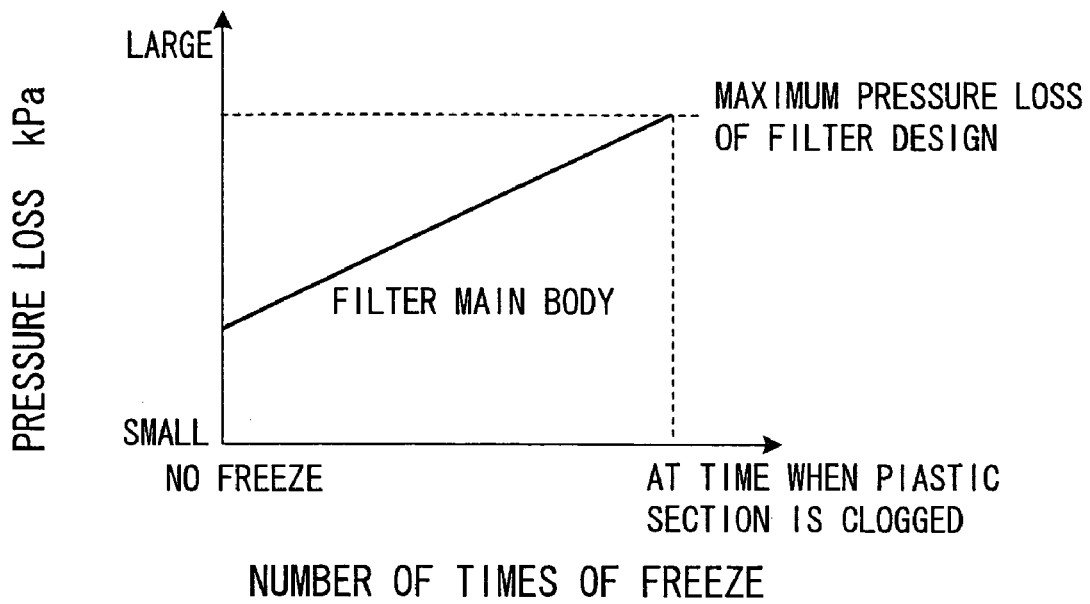
FIG. 7 is a table showing a relationship between a pressure loss of the ion exchange filter and the number of times of freezing and FIG. 8 is a view showing an ion exchange filter in a second preferred embodiment according to the present invention.

The hole diameter "d" is set so that the pressure loss becomes equal to the design maximum pressure loss of the ion exchange filter unit 60 under a condition where the purified water does not flow in the ion exchange resin 38 (refer to FIG. 7). The reason for it is as follows.

Figure 5:
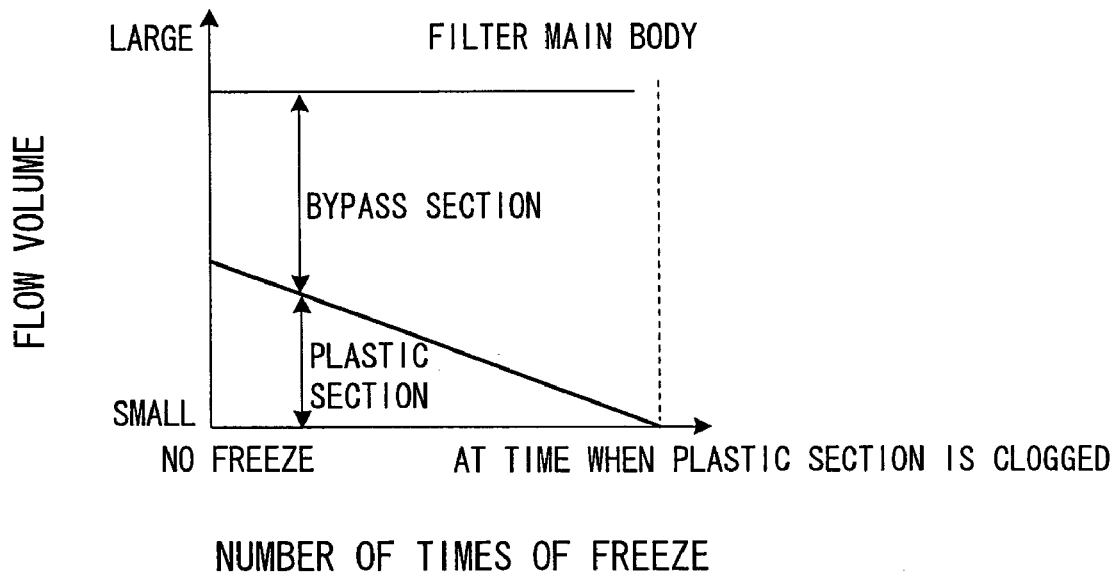
FIG. 5 is a table showing a relationship between a flow volume of purified water and the number of times of freezing.

FIG. 5 is a table showing a relationship between a flow volume of each of the ion exchange resin 38 (filter cartridge 20), the bypass passage 7, and the ion exchange filter unit 60, and the number of times of freezing in the ion exchange resin 38.

It is seen that a flow volume of the ion exchange filter unit 60 is constant regardless of the number of times of freezing, and on the other hand a flow volume of the ion exchange resin 38 reduces as the number of times of freezing increases.

This is because repetition of freezing and defrosting of the ion exchange resin 38 causes the ion exchange resin 38 to be broken and to be smaller pieces, and therefore, a water-passing resistance in the filter cartridge 20 increases, to reduce the flow volume of the purified water therein, but since the flow volume of the purified water flowing in the bypass passage 7 increases corresponding to the reduced amount of the purified water flowing in the filter cartridge 20, an entire flow amount of the purified water flowing in the ion exchange filter unit 60 does not change.

Figure 6:
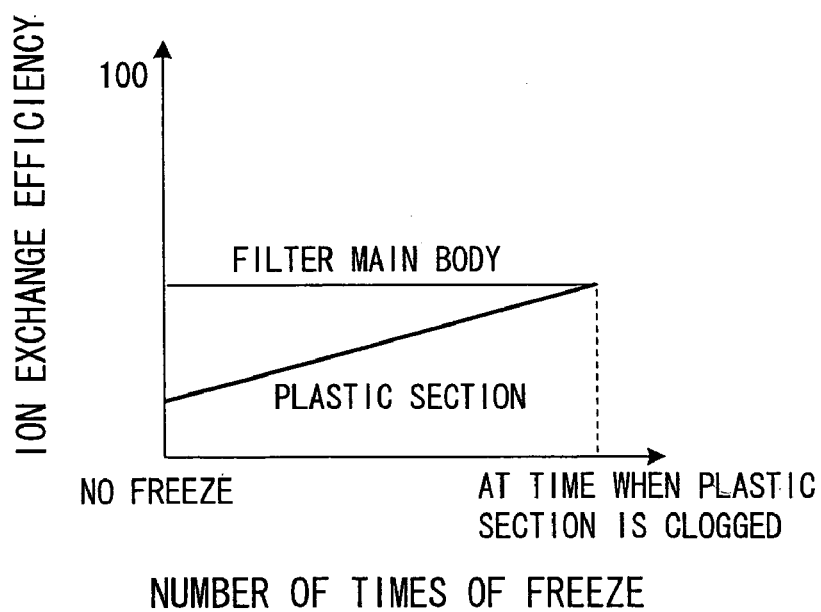
FIG. 6 is a table showing a relationship between an ion exchange efficiency and the number of times of freezing.

FIG. 6 is a table showing a relationship between an ion exchange efficiency of the ion exchange resin 38 and the ion exchange filter unit 60, and the number of times of freezing.

An ion exchange efficiency means an efficiency to remove ions, and is expressed as the following formula.

Ion exchange efficiency=(an ion exchange efficiency in a flow volume of purified water flowing in the ion exchange resin)×(a split flow ratio of purified water flowing in the exchange resin)  (1)

The ion exchange resin 38 has the characteristic that an ion exchange efficiency improves as a flow volume of the purified water reduces. And as shown in FIG. 5, a flow volume of the purified water flowing in the ion exchange resin 38 reduces as the number of times of freezing increases.

Accordingly since the flow volume of the purified water flowing in the ion exchange resin 38 reduces as the number of times of freezing increases, the ion exchange efficiency of the ion exchange resin 38 improves.

And since the flow volume of the purified water passing through the ion exchange resin 38 reduces, namely a split flow ration thereof reduces, the ion exchange efficiency of the ion exchange filter unit 60 represented by the product of the ion exchange efficiency of the ion exchange resin 38 and the split flow ratio of the ion exchange resin 38 does not change, as shown in the formula (1).

As described above, although repetition of the freezing changes the flow volume of the ion exchange resin 38 and the ion exchange efficiency, the flow volume and the ion exchange efficiency of the ion exchange filter unit 60 do not change. Accordingly the split flow ratio of the purified water flowing between the filter cartridge 20 and the bypass passage 7 can be determined without taking account into the entire fuel cell system.

Accordingly, even in case the purified water does not flow in the ion exchange resin 38, and flows only in the bypass passage 7 as a result of repetition of freezing and defrosting, no problem occurs only if the hole diameter "d" of the orifice 21 is initially set not so as to exceed the design maximum pressure loss of the ion exchange filter unit 60 is made. Therefore, the hole diameter "d" of the orifice is set such that the pressure loss of the ion exchange filter unit 60 is substantially equal to the design maximum pressure loss thereof.

In other words, the hole diameter "d" is set so that when all the amount of the purified water flowing into the ion exchange filter unit 60 is introduced in the bypass passage 7, the pressure loss generated in the orifice 21 becomes substantially equal to the allowance maximum pressure loss.

In the first preferred embodiment thus the filter cartridge 20 and the bypass passage 7 to bypass the filter cartridge 20 are disposed inside the ion exchange filter unit 60, and the hole diameter "d" to determine a split flow ratio of purified water is set such that the pressure loss of the ion exchange filter unit 60 becomes equal to the design maximum pressure loss under a condition where the purified water does not flow in the ion exchange resin 38. As a result, even if the pressure loss of the ion exchange resin 38 increases and the purified water does not flow in the filter cartridge 20, the pressure loss never exceeds the design maximum pressure loss.

Since the ion exchange filter 6, the bypass passage 7, the inlet pipe 23, the drain pipe 24, the valve 4 to switch discharge from the drain pipe 24 and flow introduction to the ion exchange filter 6, the outlet pipe 25, and the pressure sensor 5 are integrally incorporated in the ion exchange filter unit 60, the ion filter exchange apparatus becomes compact and the assembly cost reduces. And the hole diameter "d" of the orifice 21 to determine the initial split flow ratio of purified water flowing between the filter cartridge 20 and the bypass passage 7 can be set by the ion exchange filter unit 60 without taking account into the entire purified water humidification system.

Since the ion exchange resin 38, and the piston 31 and the spring 32 to compress the ion exchange resin 38 are integral with the filter cartridge 20, the replacement work at the life time of the ion exchange resin 38 becomes easy.

The open meshes 34, 35 are respectively disposed at the inlet and the outlet of the filter cartridge 20 and the fine meshes 33, 36 are respectively disposed at the passage from the cartridge 20 to the bypass passage 7 and at the outlet from the filter cartridge 20 to the outlet pipe 25, and the branch point to the bypass passage 7 is arranged downstream of the cartridge inlet. Accordingly such construction prevents the foreign materials from flowing into the bypass passage 7, and the foreign materials can be caught in the cartridge 20 without increasing the pressure loss more than necessary, as well as removal of the foreign materials can be performed together with replacement of the cartridge 20.

Since the joint face 24a of the foreign material removal filter 26 and the drain pipe 24 is arranged at a position lower than the joint face 25a of the outlet pipe 25, the purified water easily escapes from the purified water humidification system in the event of discharging the purified water inside the purified water humidification system at the operating end. And the air easily escapes from the purified water humidification system when the purified water is introduced therein at the operating restart.

Since the valve 4, the drain pipe 24, and the pressure sensor 5 are disposed in the vicinity of the foreign material-pool section 37 right before the branch point to the bypass passage 7, discharge and introduction of the purified water from and to the ion exchange filter 6 can be efficiently performed and the foreign materials in the foreign material-pool section 37 can be easily discharged in discharging the purified water. And when an excessive pressure is applied to the vicinity of the inlet of the ion exchange filter 6, the valve 4 is quickly opened to escape the purified water, to prevent damage of the purified water humidification system.

Figure 8:
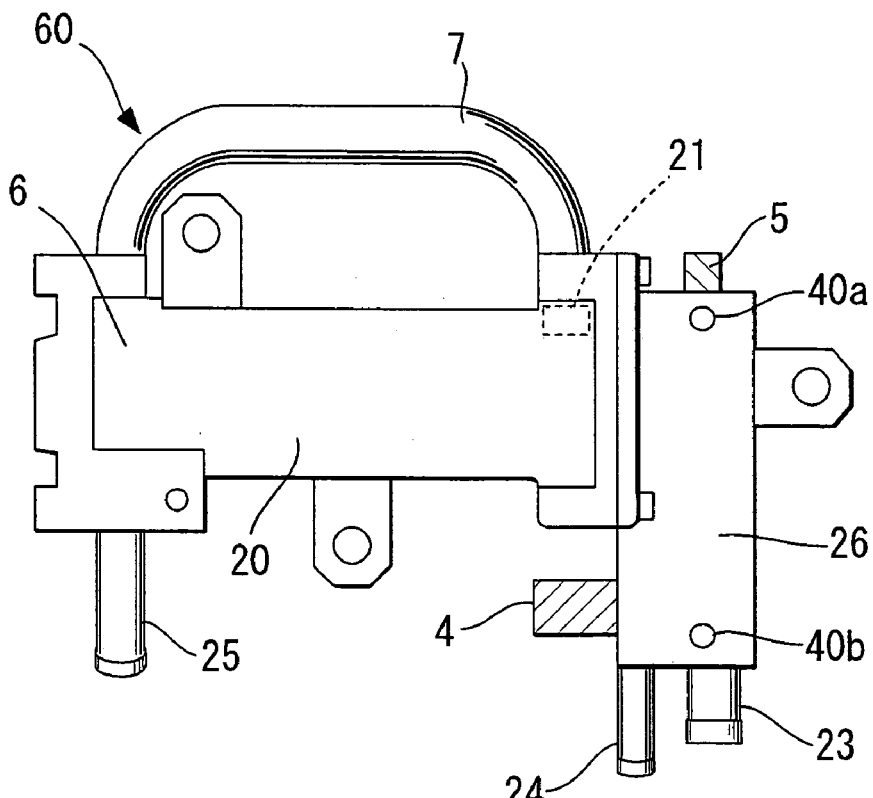

A second preferred embodiment will be explained with reference to FIG. 8.

In a system of the second preferred embodiment, heaters 40a and 40b are disposed respectively in the vicinity of each of an upper end and a lower end of the foreign material removal filter 26 of the first preferred embodiment.

The heaters 40a and 40b are used in the event of starting with operating a fuel cell system from the freezing point. Thereby, even if the purified water remains and is frozen inside the ion exchange filter unit 60 without being collected in the purified water tank 2 at an end time of the previous operating, the frozen purified water can be quickly defrosted.

The housing 18 of the ion exchange filter 6, the pipe of the bypass passage 7, and the foreign material removal filter 26 are made of a material such as stainless having a property of a low heat transfer coefficient and a small ion elution. Thereby the defrosting can be efficiently performed and the life time reduction of the ion exchange resin 38 is prevented.

And the casing 22 of the filter cartridge 20 that houses the ion exchange resin 38 therein is made of a material such as polypropylene having a property of a low heat transfer coefficient and a small ion elution. The ion exchange resin 38 has the characteristic that the resin function tends to be destroyed at a high temperature. However, the ion exchange resin 38 is sealed inside the cartridge casing 22 having a low heat transfer coefficient, thereby to prevent heat transfer of the heaters 40a and 40b and destruction of the resin function. And due to the small ion elution, the life time reduction of the ion exchange resin 38 can be prevented.

Accordingly, since in the second preferred embodiment, the heaters 40a and 40b are disposed in the ion exchange filter unit 60 and the cartridge casing 22 to be filled with the ion exchange resin 38 is made of a material having a low heat transfer coefficient and a small ion elution, the defrosting due to the heaters 40a and 40b is quickly performed at time of the frozen or the like, as well as the destruction of the ion exchange resin 38 due to heat can be prevented. And the life time reduction of the ion exchange resin 38 can be prevented due to a small ion elution.

While only selected embodiments has been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

The entire disclosures of Japanese Patent Application No.2003-399427 (filed Nov. 28, 2003) is hereby incorporated herein by reference.

What is claimed is:

1. An ion exchange filter apparatus for a liquid medium used in a fuel cell system, comprising:
    an ion exchange filter to receive an ion exchange resin for reducing ions contained in the liquid medium, the ion exchange filter comprising:
    a flow passage to introduce the liquid medium to the ion exchange resin;
    a bypass passage to flow the liquid medium by bypassing the ion exchange resin;
    an orifice disposed at a branch section where the bypass passage is branched from the flow passage, to determine a flow volume ratio of the liquid medium flowing in the ion exchange resin and the bypass passage, wherein:
    a hole diameter of the orifice is set so that a pressure loss generated when all the amount of the liquid medium flows in the bypass passage becomes substantially equal to an allowance maximum pressure loss of the ion exchange filter;

a filter housing; and a filter cartridge exchangeably received in the filter housing, wherein:

the filter cartridge includes:

the ion exchange resin received in a cartridge casing;

an urging spring to urge the ion exchange resin toward an inlet side of the cartridge casing;

the flow passage to introduce the liquid medium to the ion exchange resin;

the orifice disposed in the branch section from the flow passage to the bypass passage;

open mesh disposed in an inlet of the filter cartridge upstream of the ion exchange resin and in a backside of the urging spring downstream of the ion exchange resin, a mesh size of the open mesh being so large as to prevent outflow of the ion exchange resin; and fine mesh disposed in an outlet of the filter cartridge, a mesh size of the fine mesh being smaller than the mesh size of the open mesh.

2. The ion exchange filter apparatus according to claim 1, wherein:

the fine mesh is disposed in the branch section of the bypass passage.

3. The ion exchange filter apparatus according to claim 2, wherein:

the fine mesh disposed in the branch section of the bypass passage is directed perpendicular to the open mesh disposed in the inlet of the filter cartridge.

4. An ion exchange filter apparatus for a liquid medium used in a fuel cell system, comprising:

an ion exchange filter to receive an ion exchange resin for reducing ions contained in the liquid medium, the ion exchange filter comprising:

a flow passage to introduce the liquid medium to the ion exchange resin;

a bypass passage to flow the liquid medium by bypassing the ion exchange resin; and an orifice disposed at a branch section where the bypass passage is branched from the flow passage, to determine a flow volume ratio of the liquid medium flowing in the ion exchange resin and the bypass passage, wherein a hole diameter of the orifice is set so that a pressure loss generated when all the amount of the liquid medium flows in the bypass passage becomes substantially equal to an allowance maximum pressure loss of the ion exchange filter;

an inlet pipe into which the liquid medium flows;

an outlet pipe in which the liquid medium passing through the ion exchange resin flows out;

a drain pipe to drain the liquid medium without passing through the ion exchange resin; and a switching valve to open/close the drain pipe.

5. The ion exchange filter apparatus according to claim 4, wherein:

the drain pipe is disposed in a position lower than the outlet pipe.

6. The ion exchange filter apparatus according to claim 4, wherein:

the ion exchange filter includes:

a pressure sensor to detect pressure of the liquid medium, wherein:

the switching valve is opened when pressure of the detected liquid medium becomes excessive.

7. An ion exchange filter apparatus for a liquid medium used in a fuel cell system, comprising:

an ion exchange filter to receive an ion exchange resin for reducing ions contained in the liquid medium, the ion exchange filter comprising:

a flow passage to introduce the liquid medium to the ion exchange resin;

a bypass passage to flow the liquid medium by bypassing the ion exchange resin; and an orifice disposed at a branch section where the bypass passage is branched from the flow passage, to determine a flow volume ratio of the liquid medium flowing in the ion exchange resin and the bypass passage, wherein a hole diameter of the orifice is set so that a pressure loss generated when all the amount of the liquid medium flows in the bypass passage becomes substantially equal to an allowance maximum pressure loss of the ion exchange filter;

a filter housing;

a filter cartridge exchangeably received in the filter housing;

a heater to heat the filter housing; and a cartridge casing to receive the ion exchange resin is made of a resin having a lower heat transfer coefficient and a smaller ion elution than the filter housing.

* * * * *